United States Patent
Mao et al.

(10) Patent No.: US 10,203,976 B2
(45) Date of Patent: Feb. 12, 2019

(54) VIRTUAL APPLIANCE MANAGEMENT IN A VIRTUALIZED COMPUTING ENVIRONMENT BASED ON OPERATIONAL MODES ASSOCIATED WITH VIRTUAL APPLIANCE

(71) Applicant: VMware, Inc., Palo Alto, CA (US)

(72) Inventors: Yifeng Mao, Shanghai (CN); Pin Xie, Shanghai (CN); Junyi Shi, Shanghai (CN); Luo Bai, Sydney (AU)

(73) Assignee: VMWARE, INC., Palo Alto, CA (US)

( * ) Notice: Subject to any disclaimer, the term of this patent is extended or adjusted under 35 U.S.C. 154(b) by 58 days.

(21) Appl. No.: 14/645,436

(22) Filed: Mar. 12, 2015

(65) Prior Publication Data

US 2016/0266921 A1    Sep. 15, 2016

(51) Int. Cl.
*G06F 9/455* (2018.01)
*G06F 9/50* (2006.01)
*G06F 8/60* (2018.01)

(52) U.S. Cl.
CPC ............ *G06F 9/45558* (2013.01); *G06F 8/60* (2013.01); *G06F 9/5077* (2013.01); *G06F 2009/4557* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 9,134,988 B2* | 9/2015 | Cavazza | G06F 8/63 |
| 2005/0015756 A1* | 1/2005 | Brown | G06F 8/36 717/136 |
| 2009/0210869 A1* | 8/2009 | Gebhart | G06F 8/60 717/174 |
| 2013/0219388 A1* | 8/2013 | Moeller | G06F 9/45558 718/1 |
| 2014/0373180 A1* | 12/2014 | Barak | H04L 63/10 726/28 |
| 2015/0052517 A1* | 2/2015 | Raghu | G06F 9/4856 718/1 |
| 2015/0113530 A1* | 4/2015 | Arcese | G06F 9/45558 718/1 |

* cited by examiner

*Primary Examiner* — Eric C Wai
*Assistant Examiner* — Jorge A Chu Joy-Davila
(74) *Attorney, Agent, or Firm* — Su IP Consulting

(57) ABSTRACT

An example method to manage a virtual appliance in a virtualized computing environment may comprise obtaining, by a computing system, data relating to the virtual appliance that specifies a virtual machine implementing a software application. The method may also comprise configuring, by the computing system, an operational mode for the virtual machine to customize the virtual appliance for deployment. The method may further comprise deploying, by the computing system, the virtual appliance with the virtual machine operating in the operational mode.

13 Claims, 8 Drawing Sheets

200

```
Obtain data relating to virtual
appliance
210
        |
        v
Configure operational mode of
virtual machine of virtual
appliance
220
        |
        v
Deploy virtual appliance with
virtual machine operating in the
operational mode
230
```

VIRTUAL APPLIANCE MANAGEMENT IN A VIRTUALIZED COMPUTING ENVIRONMENT BASED ON OPERATIONAL MODES ASSOCIATED WITH VIRTUAL APPLIANCE

BACKGROUND

Unless otherwise indicated herein, the approaches described in this section are not admitted to be prior art by inclusion in this section.

Virtualization allows the abstraction of hardware resources and the pooling of these resources to support multiple virtual machines. For example, through virtualization, virtual machines with different operating systems may be run on the same physical machine. Each virtual machine is generally provisioned with virtual resources that provide similar functions as the physical hardware of a physical machine, such as central processing unit (CPU) resources, memory resources and network resources to run an operating system and applications.

In a virtualized computing environment, the utilization of virtual appliances represents a new way of deploying software applications. For developers and users, the benefits of virtual appliances include a reduction in development and distribution costs, accelerated time to market and the ability to leverage capabilities of different virtualization platforms. Although virtual appliances provide many benefits, in some scenarios, virtual appliances may not fully satisfy the requirements of the users, for example in a cost effective and efficient resource utilization manner.

DETAILED DESCRIPTION

Figure 1:
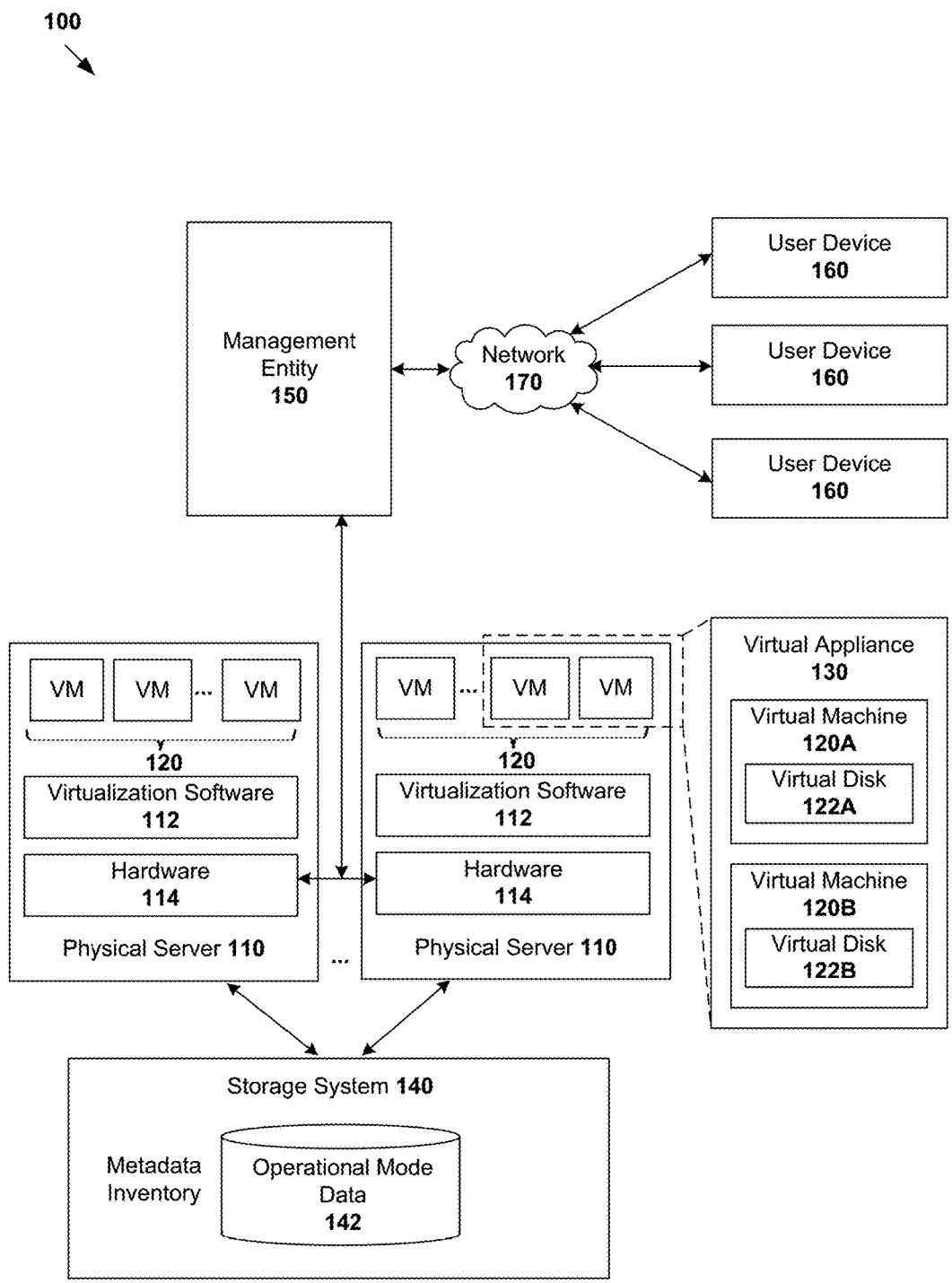
FIG. 1 is a schematic diagram illustrating an example virtualized computing environment in which a virtual appliance may be deployed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

FIG. 1 is a schematic diagram illustrating example virtualized computing environment 100 in which a virtual appliance may be deployed. Although an example is shown, it should be understood that example virtualized computing environment 100 may include additional or alternative components, and may have a different configuration.

Virtualized computing environment 100 includes physical servers 110 (also known as "hosts") that each execute virtualization software 112 (e.g., hypervisor) and include suitable hardware 114 to support multiple virtual machines 120. Virtualization software 112 maintains a mapping between resources allocated to virtual machines 120 and physical resources provided by physical servers 110 and storage system 140. In practice, there may be any suitable number of physical servers 110, each supporting any suitable number of virtual machines 120.

Virtualized computing environment 100 further includes management entity 150 that is accessible by remote user devices 160 via network 170, such as using an application programming interface (API). Management entity 150 generally provides management functionalities for users to manage various objects (e.g., physical servers 110, virtual machines 120, storage system 140, etc.), such as managing their deployment and post-deployment operation, etc. In practice, management entity 150 may be implemented by one or more virtual or physical entities. User device 160 may be any suitable device, such as a single user workstation, client computing device, etc. User device 160 may be one of multiple nodes in a build farm for developing and testing software applications. Any suitable users may operate user device 160, such as system administrators, organization administrators, database users, application developers, system architects, etc.

One or more virtual machines 120 may be packaged and deployed as virtual appliance 130 to distribute a software application. Virtual machines 120 may implement a software application having a multi-tier architecture, where each tier contains one or more virtual machines 120. The multi-tier architecture is especially suitable for software applications modelled as service oriented architectures (SOA). For example, a web application may include one tier to implement presentation logic, another tier to implement business logic, and a further tier to implement the back-end database logic. In this case, virtual appliance 130 may include three virtual machines 120, one for each tier.

For illustrative purposes, two virtual machines (i.e., 120A and 120B) are packaged as virtual appliance 130 in FIG. 1. During the deployment of virtual appliance 130, management entity 150 creates virtual machines 120 with their allocated resources. For example, the allocated resources may include CPU resources (e.g., processors), memory resources (e.g., random access memory) and network resources (e.g., access networks and group of ports), etc. In the example in FIG. 1, virtual disk 122A/122B (e.g., supported by storage system 140) represents storage resources to support a guest operating system (OS) and implementation logic.

Conventionally, when virtual appliance 130 is deployed, all of its packaged virtual machines 120 are also created. However, in some scenarios, the complete set of functionalities provided by virtual appliance 120 is not required by the users. As such, deploying the unnecessary functionalities not only wastes the allocated CPU, memory, network and storage resources, but also makes the deployment process less efficient.

According to examples of the present disclosure, the deployment of virtual appliance 130 may be customized to better satisfy the requirements of the users. In particular, an operational mode may be configured for virtual machine 120 to deploy virtual appliance 130 with virtual machine 120 operating in the operational mode.

Figure 2:
FIG. 2 is a flowchart of an example process for managing a virtual appliance in a virtualized computing environment.

In more detail, FIG. 2 is a flowchart of example process 200 for deploying and managing virtual appliance 130 in a virtualized computing environment. Example process 200 may include one or more operations, functions, or actions illustrated by one or more blocks, such as blocks 210 to 230. The various blocks may be combined into fewer blocks, divided into additional blocks, and/or eliminated based upon the desired implementation.

Example process 200 may be performed using any suitable computing system, such as management entity 150 in FIG. 1, any other suitable virtualization management system, etc. The deployment of virtual appliance 130 may be initiated using any suitable approach, such as by user device 160 communicating with management entity 150, running a script, etc. Throughout the present disclosure, the term "virtual appliance" may generally refer to a pre-built software application solution that includes one or more virtual machines 120 packaged, updated, maintained and managed as a unit.

At block 210, example process 200 includes the computing system obtaining data relating to virtual appliance 130 that specifies virtual machine 120 implementing a software application.

The "data" relating to virtual appliance 130 may be in any suitable format for packaging and distributing virtual appliances. For example, virtual appliance 130 may be packaged in Open Virtualization Format (OVF). The OVF package may include several files placed in an OVF directory, such as an OVF descriptor file (e.g., describing contents and requirements of packaged virtual machines 120), metadata (e.g., name, hardware requirements, etc.) and a group of disk images. The OVF descriptor file may be in any suitable format such as eXtensible Markup Language (XML) format, and the OVF directory may be compressed and distributed as an Open Virtualization Appliance (OVA) file.

The term "obtaining" at block 210 may include receiving the data (e.g., from user device 160 or any other device) or retrieving the data from storage (e.g., from storage system 140, using a Uniform Resource Locator (URL), etc.). The "software application" implemented by virtual machine 120 may be any suitable software solution, such as a multi-tier application whose components are encapsulated and specified by the OVF package. For example, virtual machine 120 may implement one part of the software application, such as one tier of the multi-tier application. The software application may be developed for any suitable purpose, such as to facilitate replication management; virtual infrastructure management; networking services; virtual networked storage; etc.

At block 220, example process 200 includes the computing system configuring an operational mode for virtual machine 120 to customize virtual appliance 130 for deployment. The configuration process at block 220 may include the computing system storing data relating to the operational mode, such as on storage system 140 (see also 142 in FIG. 1).

At block 230, example process 200 includes the computing system deploying virtual appliance 130 with virtual machine 120 operating in the operational mode.

The "operational mode" of virtual machine 120 may be any suitable mode that facilitates customization of virtual appliance 130 for deployment, such as activation, deactivation and substitution of virtual machine 120, etc. In more detail, the operational mode may be configured as 'ACTIVE' to activate virtual machine 120. In this case, virtual appliance 130 is deployed with virtual machine 120 operating in the 'ACTIVE' mode as usual. In practice, the 'ACTIVE' mode may be set as the default operational mode to simplify the configuration process.

In another example, the operational mode may be configured as 'INACTIVE' to deactivate the operation of virtual machine 120. One example of deactivation is to deploy virtual appliance 130 without creating virtual machine 120 because virtual machine 120 would not be required by the user. In another example, creating virtual machine 120 without allocating any resources to virtual machine 120 has the same (deactivation) effect. In a further example, virtual machine 120 configured with the 'INACTIVE' status may be created and deployed, but is then deactivated using a script or other suitable approach.

In a further example, the operational mode may be configured as 'REFERENCE' to substitute virtual machine 120 with an external entity. Here, the term "external entity" may refer to a different virtual machine or physical machine that is not packaged in virtual appliance 130. One example of substitution is to deploy virtual appliance 130 without creating virtual machine 120 because virtual machine 120 would not be required. To substitute virtual machine 120 with the external entity, the computing system may store address information of the external entity in association with virtual machine 120. If virtual machine 120 is accessed after deployment, the computing system allows access to the external entity in place of virtual machine 120 (e.g., responding with the address information of the external entity). The address information may include an Internet Protocol (IP) address, and the access may be requested by a program or script (e.g., implemented by another virtual machine 120).

Using example process 200, virtual appliance 130 may be customized for deployment when the complete set of functionalities supported by virtual appliance 130 is not required or suitable for the user. This flexibility may in turn reduce the need for manual adjustments after virtual appliance 130 is deployed, and improve resource utilization by allocating valuable resources to virtual machines 120 that most need the resources. In practice, example process 200 may be integrated with existing virtualized computing environments, allowing various existing functionalities to be fully leveraged.

Various examples of process 200 in virtualized computing environment 100 will now be described in more detail using FIG. 3 to FIG. 8.

Software Application

Figure 3:
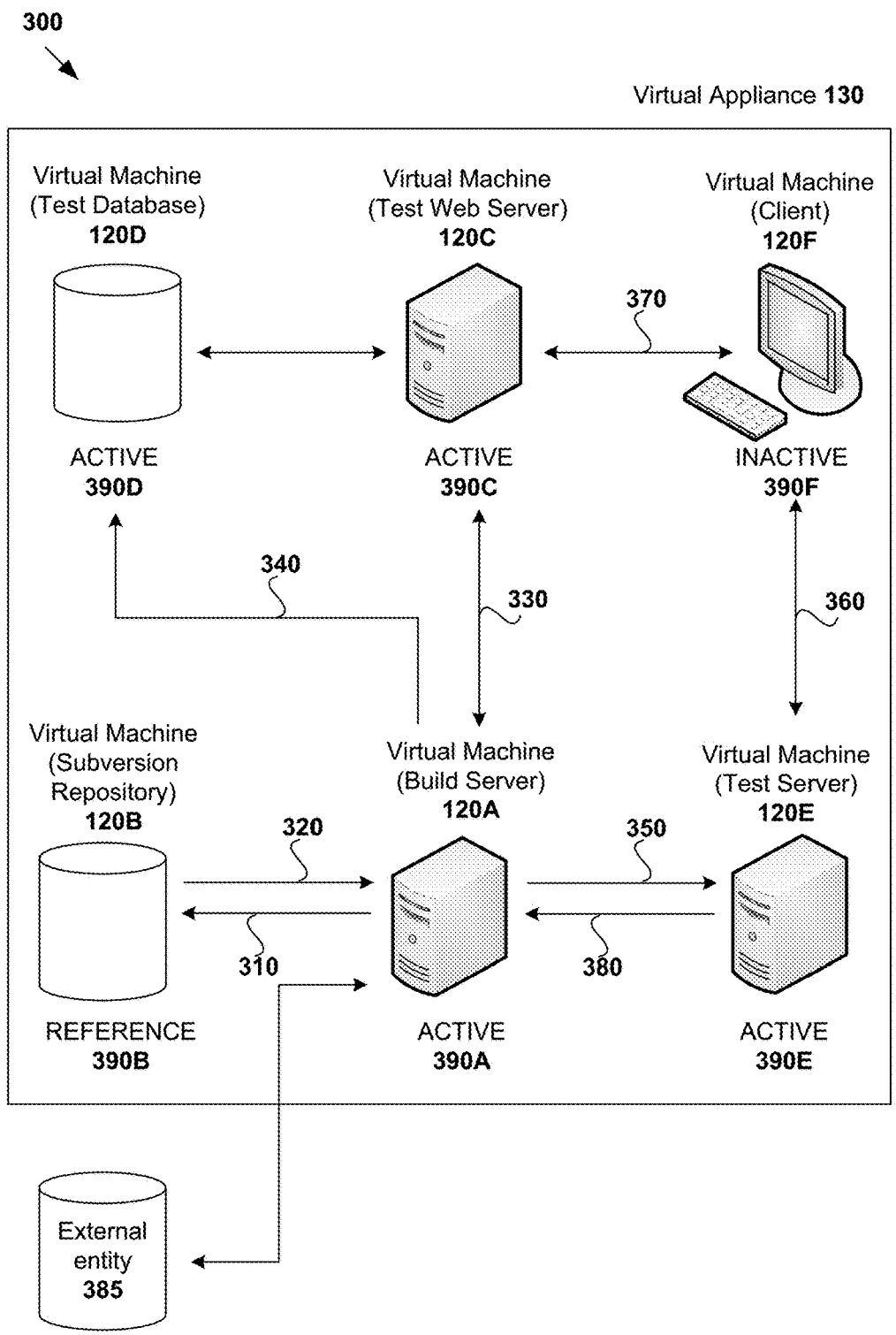
FIG. 3 illustrates a schematic diagram of an example software application implemented by virtual machines of a virtual appliance.

FIG. 3 illustrates a schematic diagram of example software application 300 implemented by virtual machines 120 of virtual appliance 130. In this example, six virtual machines (e.g., 120A, 120B, 120C, 120D, 120E and 120F) are packaged as virtual appliance 130. Example software application 300 is a web application testing solution having various components or nodes implemented by virtual machines 120A-120F. In practice, there may be additional or alternative virtual machines 120.

More specifically, virtual machines 120A and 120B may implement a build server (e.g., Jenkins server for Java applications, etc.) and a subversion repository, respectively. For example, build server 120A may automatically check subversion repository 120B for changes to the source code of a web application (see 310). If changes are detected, build server 120A retrieves the latest source code (see 320), creates a build and deploys the web application onto a test web server implemented by virtual machine 120C (see 330). Build server 120A also loads any suitable data onto a test database implemented by virtual machine 120D for later retrieval (see 340).

Virtual machine 120E may implement a test server (e.g., Selenium server) that supports web application testing, such as to automate web browsers and run test scripts, etc. For testing purposes, build server 120A may access test server 120E to run test scripts (see 350). This may then trigger test server 120E to launch one or more browsers on a client (e.g., Selenium client) implemented by virtual machine 120F to test the web application (see 360). Client 120F may access web pages of the web application via test web server 120C (see 370). Once testing completes, test server 120E reports the results to build server 120A (see 380).

Although virtual appliance 130 facilitates distribution and deployment of software application 300, the functionalities provided by virtual machines 120A-120F may not satisfy a user's requirements. For example, the user may not require the functionality of client 120F when testing a specific part of the web application. In another example, the user may not wish to use subversion repository 120B, and instead use a different or existing database not packaged as part of virtual appliance 130 (e.g., external entity 385 implemented by a physical or virtual machine).

Since the deployment of virtual appliance 130 generally causes all virtual machines 120A-120F to be created, manual adjustments are required after the deployment to better satisfy the user's requirements—a process that might be inefficient and cost-ineffective.

Configuration and Deployment

As will be described using FIG. 4, an operational mode may be configured as 'ACTIVE' to activate virtual machine 120. Alternatively, the operational mode may be configured as 'INACTIVE' to deactivate the operation of virtual machine 120; or 'REFERENCE' to substitute the operation of virtual machine 120 using an external entity. Any additional and/or alternative operational mode may be used to customize virtual appliance 130 for deployment.

Figure 4:
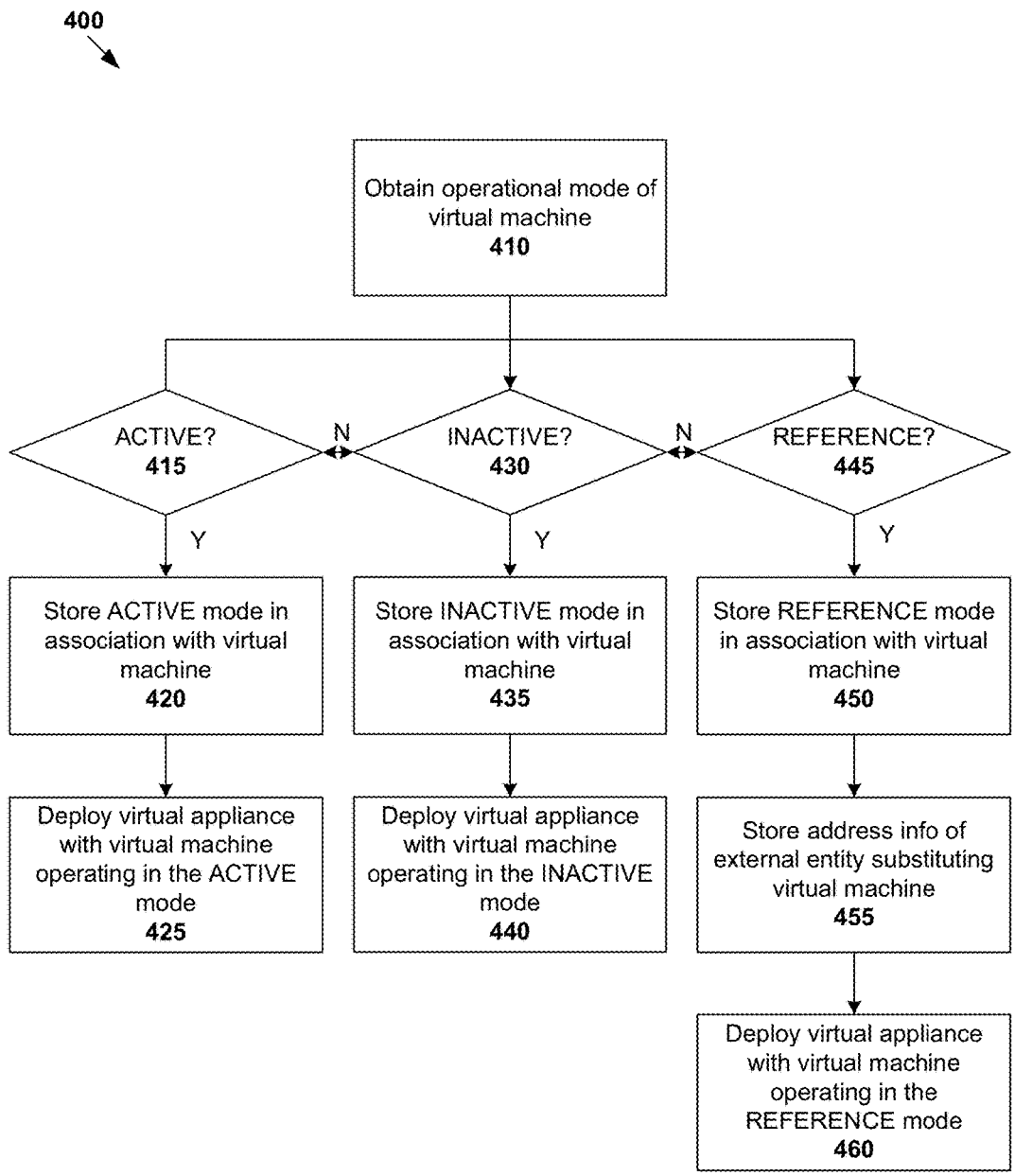
FIG. 4 is a flowchart illustrating an example process for operational mode configuration during the deployment of a virtual appliance.

FIG. 4 is a flowchart illustrating example process 400 for operational mode configuration during the deployment of virtual appliance 130. Example process 400 may include one or more operations, functions, or actions illustrated by one or more blocks, such as blocks 410 to 460. The various blocks may be combined into fewer blocks, divided into additional blocks, and/or eliminated based upon the desired implementation. Example process 400 may be performed by any suitable computing system, such as management entity 150 in FIG. 1.

At block 410 in FIG. 4 (related to block 220 in FIG. 2), management entity 150 obtains an operational mode of virtual machine 120. For example, the operational mode may be received from user device 160 via a user interface supported by management entity 150.

Figure 5:
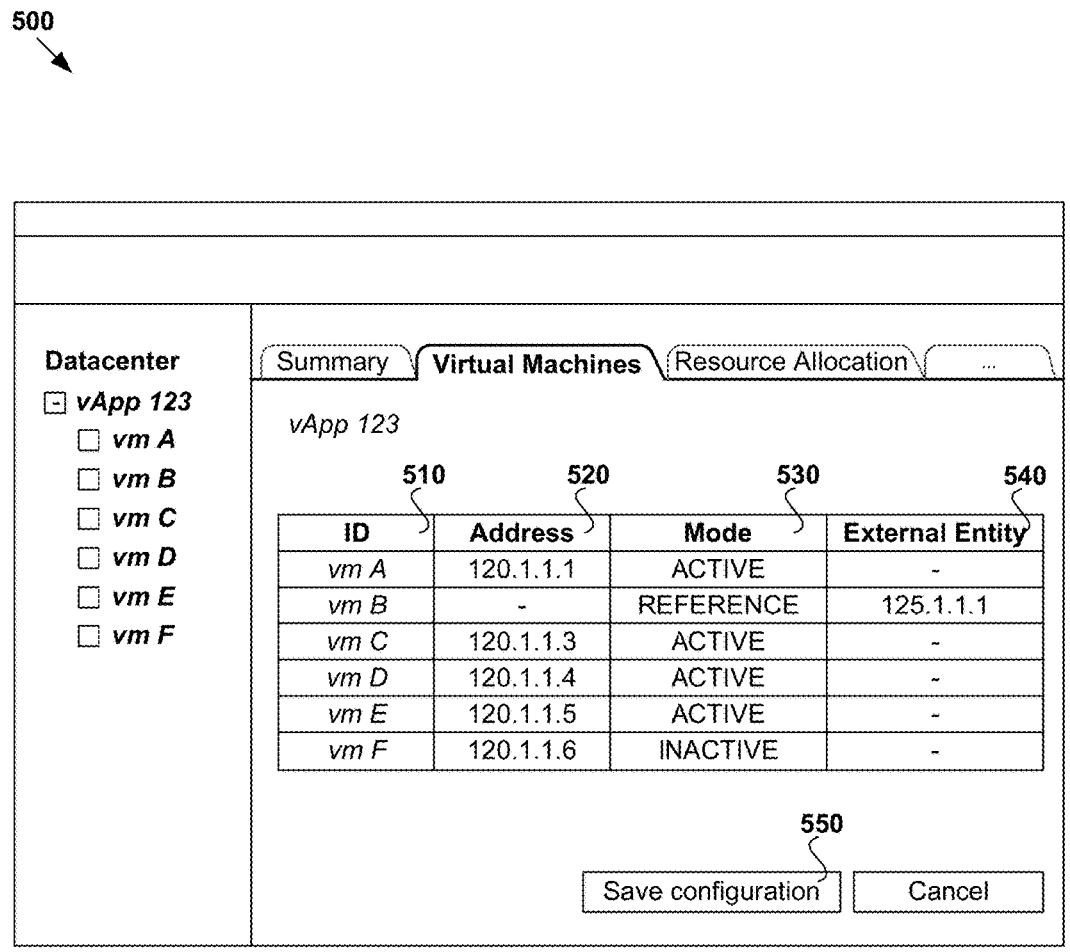
FIG. 5 illustrates an example user interface for operational mode configuration.

FIG. 5 illustrates example user interface 500 for operational mode configuration. Using the example in FIG. 3, virtual appliance 130 ("vApp 123") for deployment on a datacentre includes six virtual machines 120A (ID="vm A"), 120B (ID="vm B"), 120C (ID="vm C"), 120D (ID="vm D"), 120E (ID="vm E") and 120F (ID="vm F"), respectively (see 510). Each virtual machine 120 may also be associated with address information such as their Internet Protocol (IP) address (see 520). In practice, virtual machine 120 configured with a 'REFERENCE' operational mode (e.g., 120B, ID="vm B") may not have an associated IP address (as shown in FIG. 5).

Referring now to 530, to deactivate the client implemented by virtual machine 120F (ID="vm F"), its operational mode may be configured as 'INACTIVE'. This is also indicated at 390F in FIG. 3. To substitute the subversion repository implemented by virtual machine 120B (ID="vm B") with external entity 385, its operational mode may be configured as 'REFERENCE'. Address information of external entity 385 may be provided via user interface 500 (see 540). This is also indicated at 390B in FIG. 3. Although not shown, an icon may be placed next to each virtual machine 120 to indicate their operational mode, such as a coloured icon for 'ACTIVE', a greyed-out icon for 'INACTIVE', and an arrow icon for 'REFERENCE'.

For other virtual machines 120A, 120C, 120D and 120E, their operational mode may be configured as 'ACTIVE' to activate them during deployment. 'ACTIVE' may also be set as the default operational mode in FIG. 5. See also 390A, 390C, 390D and 390E in FIG. 3. The operational mode may be stored for later retrieval once the configuration completes (see button 550 in FIG. 5).

Referring now to blocks 415 to 460 in FIG. 4 (related to block 230 in FIG. 2), management entity 150 stores the configured operational mode configured for virtual machines 120A-120F on storage system 140. In practice, the operational mode may be stored as part of metadata inventory 142 that includes metadata of virtual machines 120A-120F.

In relation to the 'ACTIVE' operational mode, at blocks 415 and 420, management entity 150 associates virtual machines 120A, 120C, 120D and 120E with 'ACTIVE', and stores the association on metadata inventory 142. At block 425, management entity 150 deploys virtual appliance 130 with virtual machines 120A, 120C, 120D and 120E activated. In this case, management entity 150 creates and allocates resources to virtual machines 120A, 120C, 120D and 120E for them to operate in the 'ACTIVE' operational mode, i.e., according to the OVF package programmed by the developer.

In relation to the 'INACTIVE' operational mode, at blocks 430 and 435, management entity 150 associates virtual machine 120F with 'INACTIVE', and stores the association on metadata inventory 142. At block 440, management entity 150 deploys virtual appliance 130 with virtual machine 120F deactivated. In this case, management entity 150 may not create virtual machine 120F and not allocate resources to virtual machine 120F to operate in the 'INACTIVE' mode.

In relation to the 'REFERENCE' operational mode, at blocks 445 and 450, management entity 150 similarly associates virtual machine 120B with 'REFERENCE', and stores the association on metadata inventory 142. At block 455, management entity 150 also associates virtual machine 120B with external entity 385 by storing the latter's address information (e.g., "125.1.1.1" in FIG. 5) on metadata inventory 142.

At block 460, management entity 150 deploys virtual appliance 130 with virtual machine 120B substituted. In this case, management entity 150 may not create virtual machine 120B or allocate resources to virtual machine 120B because it will be substituted by external entity 385.

As can be seen, example processes 200 and 400 may facilitate better resource utilization in virtualized computing environment 100. For virtual machine 120F operating in the 'INACTIVE' mode and virtual machine 120B operating in the 'REFERENCE' mode, management entity 150 may not create virtual machines 120F and 120B and not allocate any resources to them. In this case, the efficiency of the deployment process may be improved because virtual machines 120B and 120F are not created.

Once deployed, virtual disks 122A, 122C, 122D and 122E of 'ACTIVE' virtual machines 120A, 120C, 120D and 120E will be supported by storage system 140. In other words, the data of virtual disks 122A, 122C, 122D and 122E is stored on one or more data stores of storage system 140. Further, hardware 114 (e.g., processors, network interface cards, etc.) of physical servers 110 will provide CPU and network resources to virtual machines 120A, 120C, 120D and 120E.

Post-Deployment

Figure 6:
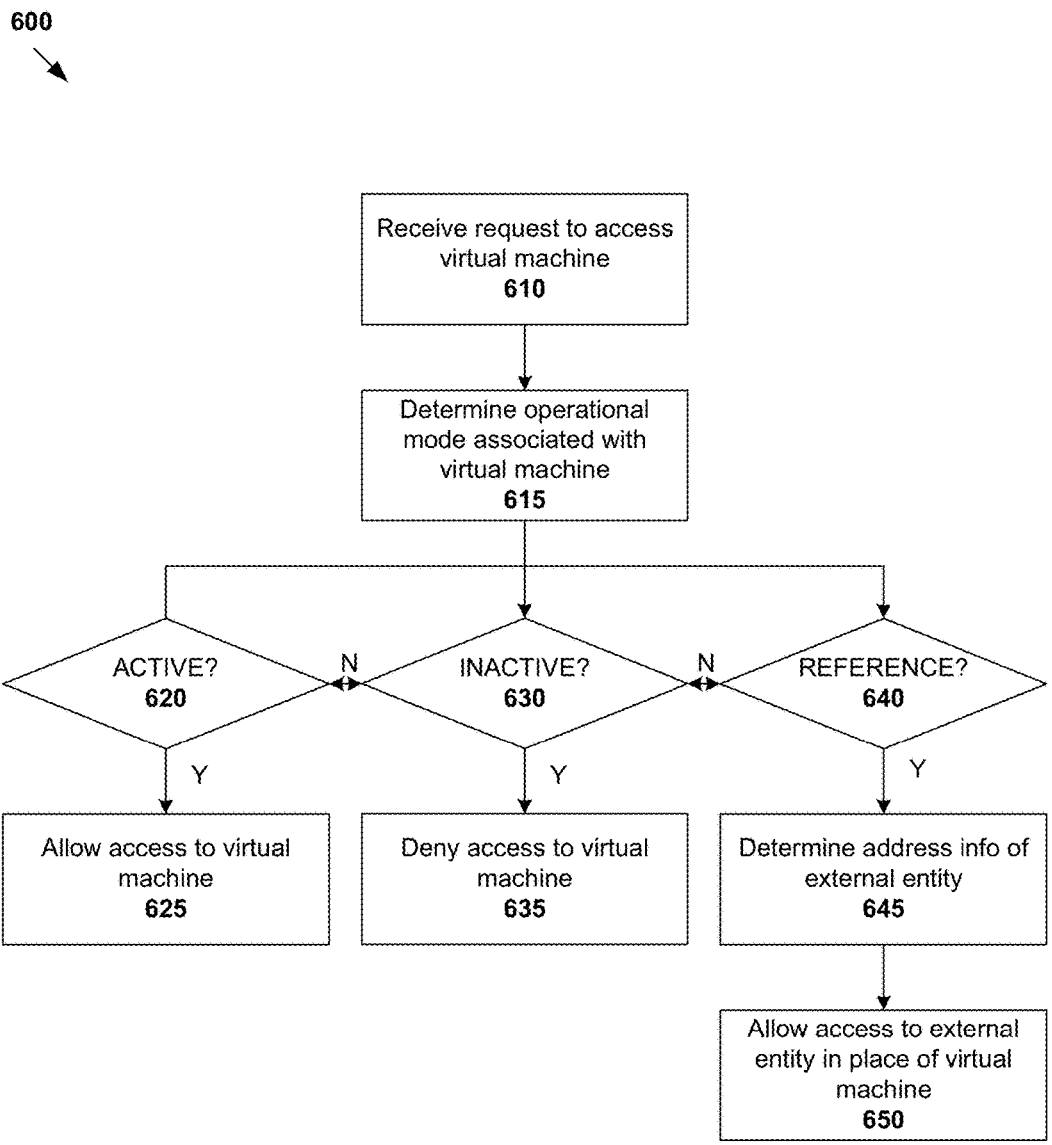
FIG. 6 is a flowchart illustrating an example process for managing access to a virtual machine configured with an operational mode after a virtual appliance is deployed.

FIG. 6 is a flowchart illustrating example process 600 for managing access to virtual machine 120 configured with an operational mode after virtual appliance 130 is deployed. Example process 600 may include one or more operations, functions, or actions illustrated by one or more blocks, such as blocks 610 to 650. The various blocks may be combined into fewer blocks, divided into additional blocks, and/or eliminated based upon the desired implementation. Example process 600 may be performed by any suitable computing system, such as management entity 150 in FIG. 1.

At block 610 in FIG. 6, management entity 150 receives a request to access virtual machine 120. For example, the request may be received from user device 160 (e.g., user), such as a program or script running on user device 160 to automatically access virtual machine 120. The access may be to invoke or use a function supported by virtual machine 120, to send or receive data, etc. It should be noted that communication between virtual machines 120 (e.g., between 120A and 120E in FIG. 3) is defined by the associated software application, and generally does not rely on management entity 150.

At block 615 in FIG. 6, management entity 150 determines an operational mode associated with virtual machine 120. This may involve retrieving the operational mode from metadata inventory 142 on storage system 140. Using the examples in FIG. 3 to FIG. 5, the operational mode may be selectively configured as 'ACTIVE', 'INACTIVE' and 'REFERENCE'.

At blocks 620 and 625 in FIG. 6, in response to determination that the operational mode is 'ACTIVE', management entity 150 allows access to virtual machine 120. In the example in FIG. 3, this scenario occurs when any one of virtual machines 120A (build server), 120C (test web server), 120D (test database) and 120E (test server) is accessed.

At blocks 630 and 635 in FIG. 6, in response to determination that the operational mode is 'INACTIVE', management entity 150 denies access to virtual machine 120. In the example in FIG. 3, this scenario occurs when virtual machine 120F (client) operating in the 'INACTIVE' mode is accessed. In this case, when the request at block 610 is denied, the requestor (e.g., user device 160) may notice that there is a connection error to virtual machine 120F.

At blocks 640 and 645 in FIG. 6, in response to determination that the operational mode is 'REFERENCE', management entity 150 retrieves the address information of the external entity associated with virtual machine 120. In the example in FIG. 3, this scenario occurs when virtual machine 120B (subversion repository) operating in the 'REFERENCE' mode is accessed, for example to query its address information. In this case, management entity 150 retrieves the address information of external entity 385 (e.g., "125.1.1.1") associated with virtual machine 120B from metadata inventory 142.

At block 650 in FIG. 6, management entity 150 allows access to external entity 385 in place of virtual machine 120B, thereby substituting virtual machine 120B with external entity 385. As such, the configuration of operational mode allows selective customization of virtual machines 120A-120F to better satisfy the runtime requirements of the user. The case of substitution further allows integration of external entity 385 with virtual appliance 130.

Reconfiguration

Figure 7:
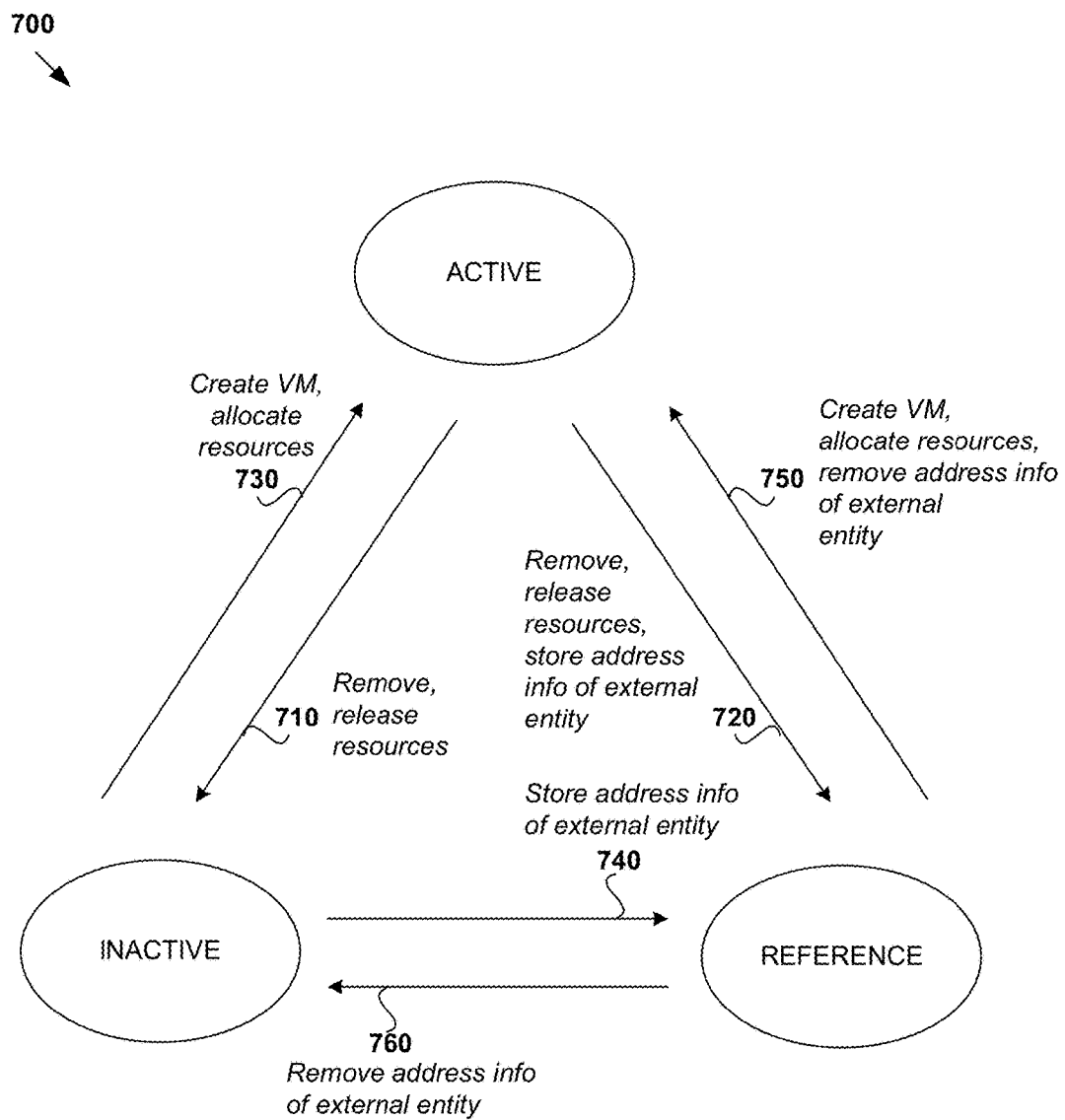
FIG. 7 is a schematic diagram illustrating example operational mode reconfiguration after a virtual appliance is deployed.

Once virtual appliance 130 is deployed, management entity 150 may facilitate operational mode reconfiguration. FIG. 7 is a schematic diagram illustrating example operational mode reconfiguration after virtual appliance 130 is deployed. The reconfiguration may be initiated using example user interface 500 in FIG. 5 or automatically using a script to update operational mode data in metadata inventory 142. Various examples 710 to 760 will be discussed with reference to the example in FIG. 3. In each example, management entity 150 reconfigures the operational mode and updates the operational mode data in metadata inventory 142 accordingly.

At 710, the operational mode of virtual machine 120C (test web server with ID="vm C") may be updated by management entity 150 from 'ACTIVE' to 'INACTIVE'. In this case, management entity 150 may delete virtual machine 120C and release the resources allocated to virtual machine 120C.

At 720, the operational mode of virtual machine 120C (test web server with ID="vm C") may be reconfigured from 'ACTIVE' to 'REFERENCE'. In this case, management entity 150 may delete virtual machine 120C, release the resources allocated to virtual machine 120C and store address information of an external entity associated with virtual machine 120C. As discussed using FIG. 6, the external entity will be accessible in place of virtual machine 120C.

At 730, the operational mode of virtual machine 120F (client with ID="vm F") may be reconfigured from 'INACTIVE' to 'ACTIVE'. In this case, management entity 150 may create virtual machine 120F, such as by deploying it from the OVF package of virtual appliance 130. Management entity 150 also allocates resources to virtual machine 120F for it to operate.

At 740, the operational mode of virtual machine 120F (client with ID="vm F") may be reconfigured from 'INACTIVE' to 'REFERENCE'. In this case, management entity 150 may store address information of an external entity associated with virtual machine 120C. Unlike 720, there is no need to release any resources if none was allocated to the previously 'INACTIVE' virtual machine 120F.

At 750, the operational mode of virtual machine 120B (subversion repository with ID="vm B") may be reconfigured from 'REFERENCE' to 'ACTIVE'. Similar to 730, management entity 150 may create virtual machine 120B, such as by deploying virtual machine 120B from the OVF package of virtual appliance 130. Management entity 150 also allocates suitable resources to virtual machine 120B for it to operate and removes the address information of any associated external entity 385.

At 760, the operational mode of virtual machine 120B (subversion repository with ID="vm B") may be reconfigured from 'REFERENCE' to 'INACTIVE'. In this case, management entity 150 removes the address information of external entity 385 associated with virtual machine 120B.

In addition to the above examples, management entity 150 may also facilitate cloning and migration of virtual appliance 130. In this case, virtual machines 120A-120F may retain their operational mode after the cloning or migration. In one implementation, powering virtual appliance 130 on and off would not affect the operational mode of virtual machines 120A-120F.

Other Applications

Although various examples have been discussed with reference to FIG. 3, it will be appreciated that virtual appliance 130 may support different software applications. Additional examples are provided below.

In a first example, a typical 3-tier web application usually includes three host nodes: (1) a web server for hosting web pages and handle user requests; (2) a business server to process user requests, update business model and data; and (3) a database for storing and persisting business data. Each host node may be implemented using virtual machine 120. To customize virtual appliance 130, an operational mode may be configured for each virtual machine 120. For example, as the database is generally a loosely coupled component, the database is not required during the deployment of a web application. An existing server is generally a better substitution. In this case, the operational mode for the database may be configured as 'REFERENCE'.

In a second example, a company-wide application generally requires single portal to do authentication. Usually a Single Sign On (SSO) server and a Lightweight Directory Access Protocol (LDAP) server are key components for authentication. However, most companies prefer to maintain their own SSO and LDAP servers, instead of creating new ones. In this case, the 'REFERENCE' operational mode may be configured for virtual machines 120 implementing the SSO and LDAP servers so that deployers may leverage existing servers in the company.

In a third example, software testers generally do not require all components of an application when they are testing a specific function. Similar to the example in FIG. 3, some virtual machines 120 may be configured with an 'INACTIVE' operational mode to reduce deployment time and resource consumption.

Computing System

Figure 8:
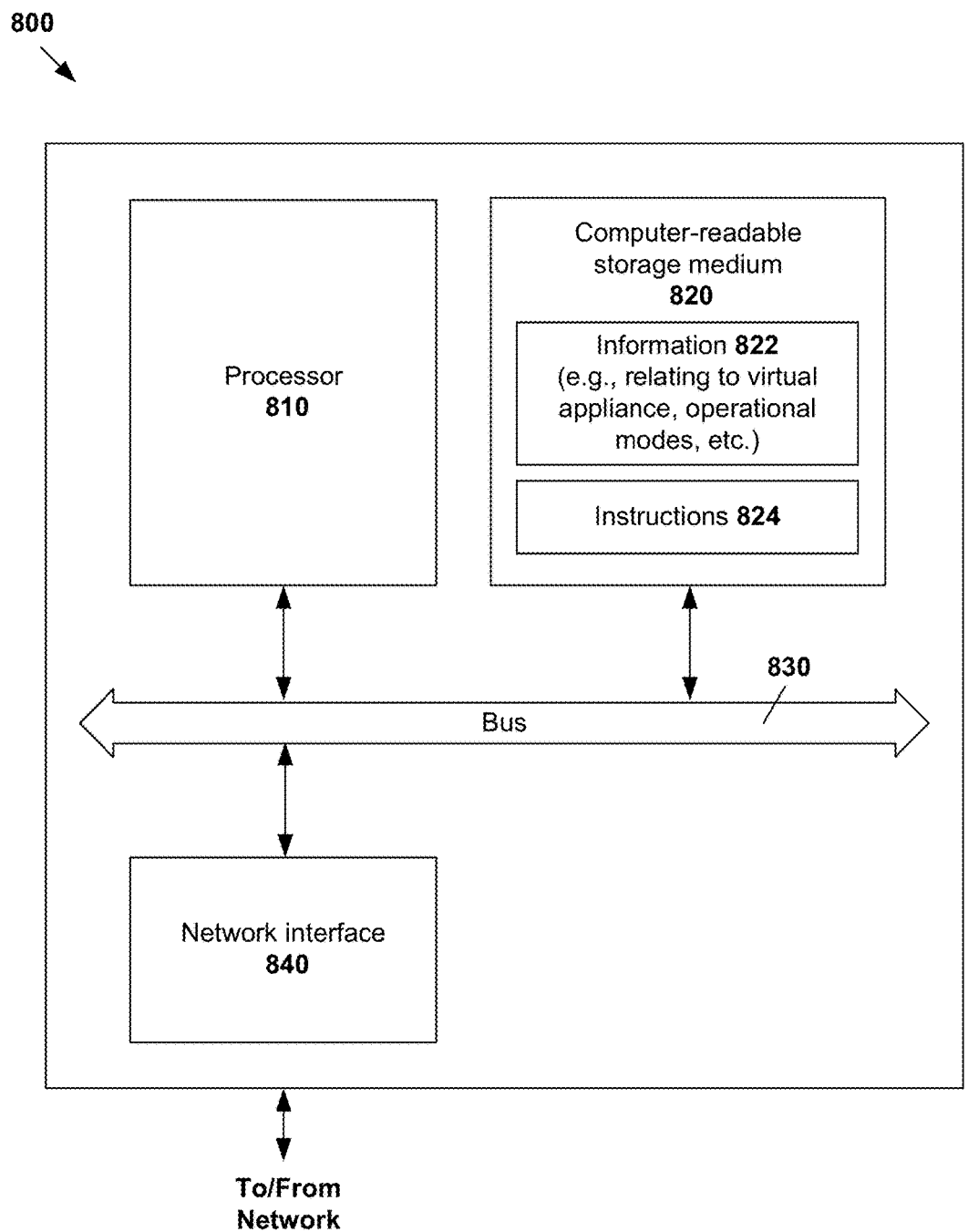
FIG. 8 is a schematic diagram illustrating an example computing system for managing a virtual appliance in a virtualized computing environment.

The above examples can be implemented by hardware, software or firmware or a combination thereof. FIG. 8 is a schematic diagram of an example computing system 800 for managing virtual appliance 130 in virtualized computing environment 100. Example computing system 800 (e.g., management entity 150 in FIG. 1) may include processor 810, computer-readable storage medium 820, network interface 840, and bus 830 that facilitates communication among these illustrated components and other components. Processor 810 is to perform processes described herein with reference to FIG. 1 to FIG. 7.

Computer-readable storage medium 820 may store any suitable information 822, such as information relating to virtual appliance 130, virtual machine 120 and operational mode in metadata inventory 142, etc. Computer-readable storage medium 820 may further store computer-readable instructions 824 which, in response to execution by processor 810, cause processor 810 to perform processes described herein with reference to FIG. 1 to FIG. 7.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method to manage a virtual appliance in a virtualized computing environment, comprising:

obtaining, by a computing system, data relating to the virtual appliance, the virtual appliance packaging virtual machines as a unit to implement at least part of a software application;

after obtaining the data relating to the virtual appliance and prior to deploying the virtual appliance, configuring, by the computing system, operational modes of the virtual machines, including storing one of an active mode, an inactive mode, and a reference mode for each of the virtual machines; and deploying, by the computing system, the virtual appliance including the packaged virtual machines based on the stored operational modes of the virtual machines, including:
- based on the active mode of a first virtual machine, creating the first virtual machine and allocating resources from the virtualized computing environment to the first virtual machine;
- based on the inactive mode of a second virtual machine, preventing creation of the second virtual machine or preventing allocation of any resources from the virtualized computing environment to the second virtual machine; and
- based on the inactive mode of a third virtual machine, refraining from creating the third virtual machine and substituting the third virtual machine with an external entity external to the virtual appliance.

2. The method of claim 1, wherein configuring the operational modes of the virtual machines further includes storing address information of the external entity in association with the third virtual machine.

3. The method of claim 2, further comprising:
receiving a request to access the third virtual machine; and
in response to determination that an operational mode of the third virtual machine is the reference mode, allowing access to the external entity in place of the third virtual machine according to the address information.

4. The method of claim 2, further comprising:
after deploying the virtual appliance, reconfiguring an operational mode of the third virtual machine;
in response to determination that the operational mode of the third virtual machine is reconfigured from the reference mode to the inactive mode, removing the address information of the external entity; and
in response to determination that the operational mode of the third virtual machine is reconfigured from the reference mode to the active mode, creating the third virtual machine, allocating additional resources from the virtualized computing environment to the third virtual machine, and removing the address information of the external entity.

5. The method of claim 1, further comprising:
receiving a request to access the second virtual machine; and
in response to determination that an operational mode of the second virtual machine is the inactive mode, denying access to the second virtual machine.

6. The method of claim 1, further comprising:
after deploying the virtual appliance, reconfiguring an operational mode of the first virtual machine;
in response to determination that the operational mode of the first virtual machine is reconfigured from the active mode to the inactive mode, deleting the first virtual machine and releasing the resources allocated to the first virtual machine; and
in response to determination that the operational mode of the first virtual machine is reconfigured from the active mode to the reference mode, deleting the first virtual machine, releasing the resources allocated to the first virtual machine, and associating address information of the external entity with the first virtual machine.

7. The method of claim 1, wherein the data relating to the virtual appliance is an Open Virtualization Format (OVF) package or Open Virtualization Appliance (OVA) file that packages the virtual appliance for deployment.

8. The method of claim 1, further comprising:
after deploying the virtual appliance, reconfiguring an operational mode of the second virtual machine;
in response to determination that the operational mode of the second virtual machine is reconfigured from the inactive mode to the active mode, creating the second virtual machine, if not previously created, and allocating additional resources from the virtualized computing environment to the second virtual machine; and
in response to determination that the operational mode of the second virtual machine is reconfigured from the inactive mode to the reference mode, substituting the second virtual machine with an external entity external to the virtual appliance.

9. A non-transitory computer-readable storage medium that includes a set of instructions which, in response to execution by a processor of a computing system, causes the processor to perform a method to manage a virtual appliance in a virtualized computing environment, the method comprising the computing system:
obtaining data relating to the virtual appliance, the virtual appliance specifying at least a virtual machine, the virtual machine implementing at least part of a software application;
configuring an operational mode for the virtual machine to customize the virtual appliance for deployment after obtaining the data relating to the virtual appliance and prior to deploying the virtual appliance, wherein configuring comprises obtaining and storing the operational mode of the virtual machine;
deploying the virtual appliance with the virtual machine operating in the operational mode, the operational mode being an active mode where the virtual machine is created and allocated resources from the virtualized computing environment to the virtual machine, an inactive mode where the virtual machine is not created and does not have any hardware resources allocated from the virtualized computing environment, or a reference mode where the virtual machine is substituted with an entity external to the virtual appliance; and
after deploying the virtual appliance, reconfiguring the operational mode of the virtual machine by performing one or more of the following:
in response to determination that the operational mode is reconfigured from the active mode to the inactive mode, deleting the virtual machine, and releasing the resources allocated to the virtual machine;
in response to determination that the operational mode is reconfigured from the active mode to the reference mode, deleting the virtual machine, releasing the resources allocated to the virtual machine, and associating address information of the external entity with the virtual machine;
in response to determination that the operational mode is reconfigured from the reference mode to the inactive mode, removing the address information of the external entity;
in response to determination that the operational mode is reconfigured from the reference mode to the active mode, creating the virtual machine, allocating the resources to the virtual machine, and removing the address information of the external entity;
in response to determination that the operational mode is reconfigured from the inactive mode to the active mode, creating the virtual machine and allocating the resources to the virtual machine; and in response to determination that the operational mode is reconfigured from the inactive mode to the reference mode, crating the virtual machine and associating the address information of the external entity with the virtual machine.

10. The non-transitory computer-readable storage medium of claim 9, wherein configuring the operational mode comprises storing the address information of the external entity in association with the virtual machine.

11. The non-transitory computer-readable storage medium of claim 10, further comprising:
receiving a request to access the virtual machine; and
in response to determination that the operational mode of the virtual machine is the reference mode, allowing access to the external entity in place of the virtual machine according to the address information.

12. The non-transitory computer-readable storage medium of claim 9, further comprising:
receiving a request to access the virtual machine; and
in response to determination that the operational mode of the virtual machine is the inactive mode, denying access to the virtual machine.

13. A computing system for managing a virtual appliance in a virtualized computing environment, wherein the computing system comprises:
a processor; and
a non-transitory computer-readable storage medium storing instructions that, when executed by the processor, cause the processor to:
obtain data relating to the virtual appliance, the virtual appliance specifying at least a virtual machine, the virtual machine implementing at least part of a software application;
configure an operational mode for the virtual machine to customize the virtual appliance for deployment after obtaining the data relating to the virtual appliance and prior to deploying the virtual appliance, wherein configure comprises obtaining and storing the operational mode of the virtual machine; and
deploy the virtual appliance with the virtual machine operating in the operational mode, the operation mode being an active mode where the virtual machine is created and allocated resources from the virtualized computing environment, an inactive mode where the virtual machine is not created and does not have any hardware resources allocated from the virtualized computing environment, or a reference mode where the virtual machine is substituted with an entity external to the virtual appliance; and
after deploying the virtual appliance, reconfigure the operational mode of the virtual machine by performing one or more of the following:
in response to determination that the operational mode is reconfigured from the active mode to the inactive mode, deleting the virtual machine, and releasing the resources allocated to the virtual machine;
in response to determination that the operational mode is reconfigured from the active mode to the reference mode, deleting the virtual machine, releasing the resources allocated to the virtual machine, and associating address information of the external entity with the virtual machine;
in response to determination that the operational mode is reconfigured from the reference mode to the inactive mode, removing the address information of the external entity;
in response to determination that the operational mode is reconfigured from the reference mode to the active mode, creating the virtual machine, allocating the resources to the virtual machine, and removing the address information of the external entity;
in response to determination that the operational mode is reconfigured from the inactive mode to the active mode, creating virtual machine and allocating the resources to the virtual machine; and
in response to determination that the operational mode is reconfigured from the inactive mode to the reference mode, creating the virtual machine and associating the address information of the external entity with the virtual machine.

* * * * *